United States Patent
Donetz et al.

(10) Patent No.: US 12,038,091 B2
(45) Date of Patent: Jul. 16, 2024

(54) ROTARY VALVE WITH REDUCED FLUSHING TIME

(71) Applicant: TECAN TRADING AG, Männedorf (CH)

(72) Inventors: Anthony Donetz, Hayward, CA (US); Michael Kennedy, Los Gatos, CA (US)

(73) Assignee: TECAN TRADING AG, Männedorf (CH)

( * ) Notice: Subject to any disclaimer, the term of this patent is extended or adjusted under 35 U.S.C. 154(b) by 145 days.

(21) Appl. No.: 17/756,099

(22) PCT Filed: Sep. 4, 2020

(86) PCT No.: PCT/US2020/049448
§ 371 (c)(1),
(2) Date: May 17, 2022

(87) PCT Pub. No.: WO2022/050956
PCT Pub. Date: Mar. 10, 2022

(65) Prior Publication Data
US 2022/0403943 A1 Dec. 22, 2022

(51) Int. Cl.
*F16K 11/074* (2006.01)
(52) U.S. Cl.
CPC ................ *F16K 11/0743* (2013.01)
(58) Field of Classification Search
CPC .. F16K 11/0743; F16K 3/08; G01N 2030/202
See application file for complete search history.

(56) References Cited

U.S. PATENT DOCUMENTS

| 5,419,208 A | 5/1995 | Schick |
| 7,308,908 B2 | 12/2007 | Keene et al. |

(Continued)

FOREIGN PATENT DOCUMENTS

| EP | 2459915 B1 | 6/2013 |
| WO | 2014/047108 A1 | 3/2013 |

(Continued)

OTHER PUBLICATIONS

Donetz, "MiniValve (MV) Development Update," Jul. 25, 2020, 9 pages.

(Continued)

*Primary Examiner* — Marina A Tietjen
(74) *Attorney, Agent, or Firm* — MH2 TECHNOLOGY LAW GROUP LLP (57) ABSTRACT

A rotary valve includes a stator member with a planar stator face, the stator member having a plurality of stator channels for conducting a fluid; and a rotor member with a planar rotor face facing and in contact with the stator face, the rotor member having a rotor channel; wherein the rotor member is rotatable with respect to the stator member about a rotation axis, such that in a conducting position, the rotor channel interconnects two of the stator channels and the two stator channels are in fluid communication; wherein at least one of the stator channels has a transverse channel section opening into the stator face and running transversely with respect to the rotation axis; wherein the rotor channel has a bottom, which at an intersection end of the rotor channel is inclined with respect to the rotation axis, such that the rotor channel elongates an inner surface of the stator channel, when the rotor member is in the conducting position.

13 Claims, 5 Drawing Sheets

(56) References Cited

U.S. PATENT DOCUMENTS

| | | | |
|---|---|---|---|
| 2006/0260695 A1 | 11/2006 | Keene et al. | |
| 2009/0320925 A1* | 12/2009 | Nichols | F16K 3/08 137/625.46 |
| 2015/0226712 A1* | 8/2015 | Jencks | G01N 30/36 137/1 |
| 2016/0033049 A1 | 2/2016 | Nichols et al. | |

FOREIGN PATENT DOCUMENTS

| | | |
|---|---|---|
| WO | 2014/047108 A8 | 3/2014 |
| WO | 2015/187868 A2 | 12/2015 |

OTHER PUBLICATIONS

Author Unknown, "Typ RH 7010," product catalogue brochure, (date unknown), 5 pages.

Author Unknown, "Inst Assy Mini-Valve PA Encoder," product brochure, (date unknown), 2 pages.

Author Unknown, "Internally Purged Injectors and Selectors," GC Internally purged valves, Valco Instruments Co. Inc. product brochure, (date unknown), 1 page.

Author Unknown, "Microbore Continuous Flow Through-the-Handle Injectors," HPLC Microbore, Valco Instruments Co. Inc. product brochure, (date unknowN), 1 page.

Author Unknown, "OEM Module SPM Zero Dead Volume Dilutor," product brochure, (date unknown), 3 pages.

Author Unknown, "Valve and Valve Drive," product description, (date unknown), 1 page.

PCT Transmittal of the International Search Report and the Written Opinion of the International Searching Authority, or the Declaration mailed May 26, 2021 in corresponding PCT Application No. PCT/US2020/049448.

Nakamura, Y. (Authorized officer), International Preliminary Report on Patentability in corresponding International Application No. PCT/US2020/049448 mailed on Mar. 16, 2023, 8 pages.

* cited by examiner

ROTARY VALVE WITH REDUCED FLUSHING TIME

CROSS-REFERENCE TO RELATED APPLICATION(S)

This application is a U.S. National Stage application of PCT/US2020/049448, filed Sep. 4, 2020, the entire contents of which is incorporated herein by reference.

FIELD OF THE INVENTION

The invention relates to a rotary valve.

BACKGROUND OF THE INVENTION

Rotary valves may be used in laboratory automation systems for distributing liquids, such as reagents, dilutions, samples, etc. A rotary valve usually comprises a stator member with stator channels and a rotor member, which comprises a rotor channel. Dependent on different rotary positions, the rotor channel interconnects different stator channels with each other. A pump may convey a liquid from a first container and/or channel into the rotary valve and the rotary valve may distribute the liquid into other containers and/or channels dependent on its rotor position. The rotary valve also may draw from one of a plurality of source containers and may distribute the fluid into a common outlet.

An important feature of any valve in a laboratory automation system is the flushing time, i.e. the time in which a first liquid in the valve can be substituted with another liquid. A fast flushing time of Su the valve may increase the overall throughput of an analytical instrument.

A second important feature of any valve in a laboratory automation system is the flushing volume, i.e. the volume required to substitute a first liquid in the valve with another liquid. The first liquid has to be flushed out completely by the other liquid in order to prevent cross contamination which may impact downstream processes/analyses. Small flushing volume may decrease flushing time and/or may save precious reagents.

U.S. Pat. No. 7,308,908 B2 shows a rotary valve with a stator channel in a stator member, which stator channel is transversely aligned to a rotation axis of a rotor member.

DESCRIPTION OF THE INVENTION

The objective of the invention is a rotary valve with a reduced flushing time.

This objective is met by the subject-matter of the independent claim. Further exemplary embodiments are evident from the dependent claims and the following description.

The invention relates to a rotary valve comprising a stator member with a planar stator face, the stator member having a plurality of stator channels for conducting a fluid and a rotor member with a planar rotor face facing and in contact with the stator face, the rotor member having at least one rotor channel. The rotor member is rotatable with respect to the stator member about a rotation axis, such that in a conduction position, the rotor channel interconnects two of the stator channels and the two stator channels are in fluid communication. The stator face and the rotor face may be parallel. The rotation axis may be aligned orthogonally to the stator face and the rotor face.

The stator member and the rotor member may be accommodated in a housing of the rotary valve, wherein the stator member may be statically connected with the housing and the rotor member may be rotatably connected with the housing. The rotor member may be rotated by a step motor. A pump, such as an automatically actuated syringe, may be connected to one of the stator channels. The housing of the rotary valve furthermore may comprise means for pressing the rotor face against the stator face, such as a spring.

The stator member and/or the rotor member may be made of a ceramics material e.g. alumina, metal e.g. stainless steel or polymer e.g. PEEK (Polyetheretherketone) or ETFE (Ethylene Tetrafluoroethylene). The stator channels may be made of bores machined in the material before or after sintering or formed by inserting a wire before pressing or molding, which are removed after forming. The rotor channel may be made by machining a groove into the material. It also may be that the rotor member and/or the stator member are 3D printed, for example by laser sintering.

There may be more than one conduction position. It may be that the stator member has a stator channel with a central opening that opens into the rotor channel in any conduction position. It may be that the stator member has one or more eccentric stator channels with an opening spaced apart from the rotation axis. In a specific conduction position, one of the eccentric stator channels may be connected with the stator channel with the central opening.

According to an embodiment of the invention, at least one of the stator channels has a transverse channel section opening into the stator face and running transversely with respect to the stator face, the rotor face and/or the rotation axis. Transverse may mean that a central line of the transfers channel is not orthogonal with respect to the stator face and/or the rotor face. Transverse may mean that a central line of the transverse channel projected onto a plane comprising the rotation axis is not parallel and is not orthogonal. The transverse channel section may have a cylindrical form and/or may have a circular cross-section. It also may be that the transverse channel section has an ellipsoid, egg shaped or polygonal cross-section. The interface of the transverse channel section and the stator face may be elongated, such as egg-shaped or ellipsoidal.

With a transverse channel section, the overall length of the fluid path through the stator member and the rotor member may be shortened. This may decrease the flushing time. With a transverse channel orientation, the flushing performance may be improved compared to an orthogonal orientation.

The at least one stator channel with the transverse channel section may be an eccentric stator channel. In the case, the stator member has more than one eccentric stator channel, each of the eccentric stator channels may have a transverse channel section. At least some of the transverse channel sections may be symmetric with respect to each other by rotation about the rotation axis.

It also may be that there is one or more pairs of stator channels, which are interconnected by a rotor channel. Both stator channels of a pair may have transverse channel sections. It also may be that one stator channel of a pair has a transverse channel section and that the other one is orthogonally aligned to the stator face. The pairs of stator channels may be symmetric with respect to each other by rotation about the rotation axis.

According to an embodiment of the invention, the rotor channel has a bottom, which at an intersection end of the rotor channel is inclined with respect to the rotor face, the stator face and/or the rotation axis, such that the rotor channel elongates an inner surface of the stator channel, when the rotor member is in the conducting position. As transverse, inclined may mean that the bottom has a substantially flat bottom surface and/or substantially straight bottom line, which is angled with respect to the rotor face, the stator face and/or the rotation axis. By elongating the stator channel and in particular the transverse channel section with the rotor channel, substantial continuous surfaces may be formed.

With the inclined bottom of the rotor channel, turbulences and/or vorticities in the transition between the rotor channel and the stator channel may be reduced. This also may reduce the flushing time, since a more laminar fluid flow may be achieved. Furthermore, a reduced flushing volume may be achieved by avoiding dead points.

An inclined bottom of the rotor channel may be provided by a rotor channel, which at the intersection end becomes deeper with increasing distance from the outermost position of the rotor channel. Over a range, the increase of the depth may be linear with respect to the distance to the outermost position.

According to an embodiment of the invention, the rotor channel is a groove in the rotor face. Over its complete extension, the rotor channel always may be opened towards the rotor face.

According to an embodiment of the invention, the rotor channel has a U-shaped cross-section. The bottom surface of the rotor channel may have a substantial circular cross-section.

According to an embodiment of the invention, a bottom line of the rotor channel at the intersection end is inclined with respect to the rotor face, the stator face and/or the rotation axis. The bottom line may be composed of the lowest points of the U-shaped cross-sections along the extension of the rotor channel.

According to an embodiment of the invention, the bottom of the rotor channel at the interconnection end is inclined with respect to the rotor face, the stator face and/or the rotation axis with the same angle as the stator channel. In such a way, a cylindrical shape of the transverse channel section of the stator channel may be elongated substantially flush with the rotor channel.

According to an embodiment of the invention, the bottom of the rotor channel at a second interconnection end, which opens into a further stator channel, which may be a parallel stator channel, is aligned orthogonally to the rotation axis (and/or parallel to the rotor face and/or the stator face). The first interconnection end may be used for interconnecting the rotor channel with a transverse channel section of a (for example eccentric) stator channel. The second interconnection end may be used for interconnecting the rotor channel with a parallel stator channel. The rotor channel may have an inclined part at the first interconnection end, which transitions into an orthogonally aligned part at the second interconnection end.

According to an embodiment of the invention, the rotor channel extends radially with respect to the rotation axis. The rotor channel may be substantially straight. One end of the rotor channel may be at the center of the rotor member, i.e. at the rotation axis.

According to an embodiment of the invention, the rotor channel extends tangential with respect to a circle around the rotation axis. It also may be that there are a plurality of rotor channels, which may be distributed symmetrically with respect to the rotation axis.

According to an embodiment of the invention, a center line of the transverse channel section intersects with the rotation axis. In other words, the rotation axis and the stator channel may be arranged in one plane.

According to an embodiment of the invention, the transverse channel section has an opening in the stator face, which at a side, where an angle between the transverse channel section and the stator face is acute, has a side wall running parallel to the rotation axis. An acute part of the stator member between the transverse channel section and the stator face may be removed. This may reduce the danger of damages of the stator member at this position. The volume produced by material removed from the stator member, i.e. the volume between a cylindrical part of the transverse channel section and the parallel side wall, may be small, such that this nearly does not influence the flushing time.

According to an embodiment of the invention, the stator member comprises a parallel stator channel, which runs parallel to and/or along the rotation axis of the rotor member. The parallel stator channel may be the only input and/or output of the rotary valve from which the fluid is distributed to and/or collected from the eccentric stator channels, which then act as outputs and/or inputs. Both sections may have a circular cross-section and/or may be centred with respect to each other.

It also may be that a parallel stator channel is running spaced apart from the rotation axis. For example, pairs of stator channels, which are arranged symmetrically around the rotation axis may have a parallel stator channel.

A connection port may be a substantially cylindrical opening in the rotary valve for connecting pipes or hoses to the rotary valve. The connection ports, which may be designed to receive screwed fittings, may be provided by the stator member or a further member of the rotary valve arranged on a surface of the stator member opposite to the stator face.

According to an embodiment of the invention, the parallel stator channel has a first section opening into the rotor channel and a second section opening towards a connection port of the rotary valve. The second section has a smaller diameter as the first section. This may help forming a laminar fluid flow between the connection port and the parallel stator channel and/or also may reduce the flushing time.

According to an embodiment of the invention, the stator member comprises a circular groove surrounding the stator face. The circular groove may have an inclined surface, which is inclined with respect to the rotation axis. The transverse channel section(s) of the one or more eccentric stator channels may run along this circular groove. In particular, the transverse channel sections open the possibility, such that such a groove can be formed in the stator. With the groove, the stator may be designed more compact. The circular groove also may provide space so that any leakage between the rotor member and stator member may leave the rotary valve through a drain hole, rather than forcing through the sealed bearing and possibly damaging the bearing and/or valve.

According to an embodiment of the invention, the inclined surface is inclined with respect to the rotation axis with the same angle as the transverse channel section. In such a way, material between the inclined surface and the transverse channel sections may be spared.

According to an embodiment of the invention, a bearing surrounding the rotor member protrudes into the circular groove. The bearing may be used for supporting a rotation of the rotor. An overall length of the rotary valve may be reduced. The bearing may be a sliding bearing or a ball bearing.

According to an embodiment of the invention, the stator channel with the transverse channel section has a parallel channel section, which opens towards a connection port of the rotary valve. The parallel channel section runs parallel to the rotation axis. The transverse channel section and the parallel channel section may have the same diameter and/or may have a circular cross-section. The connection port to the stator channel may be aligned parallel to the rotation axis. In such a way, a laminar fluid flow between the stator channel and the connection port is supported. This also may support reducing the flushing time.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
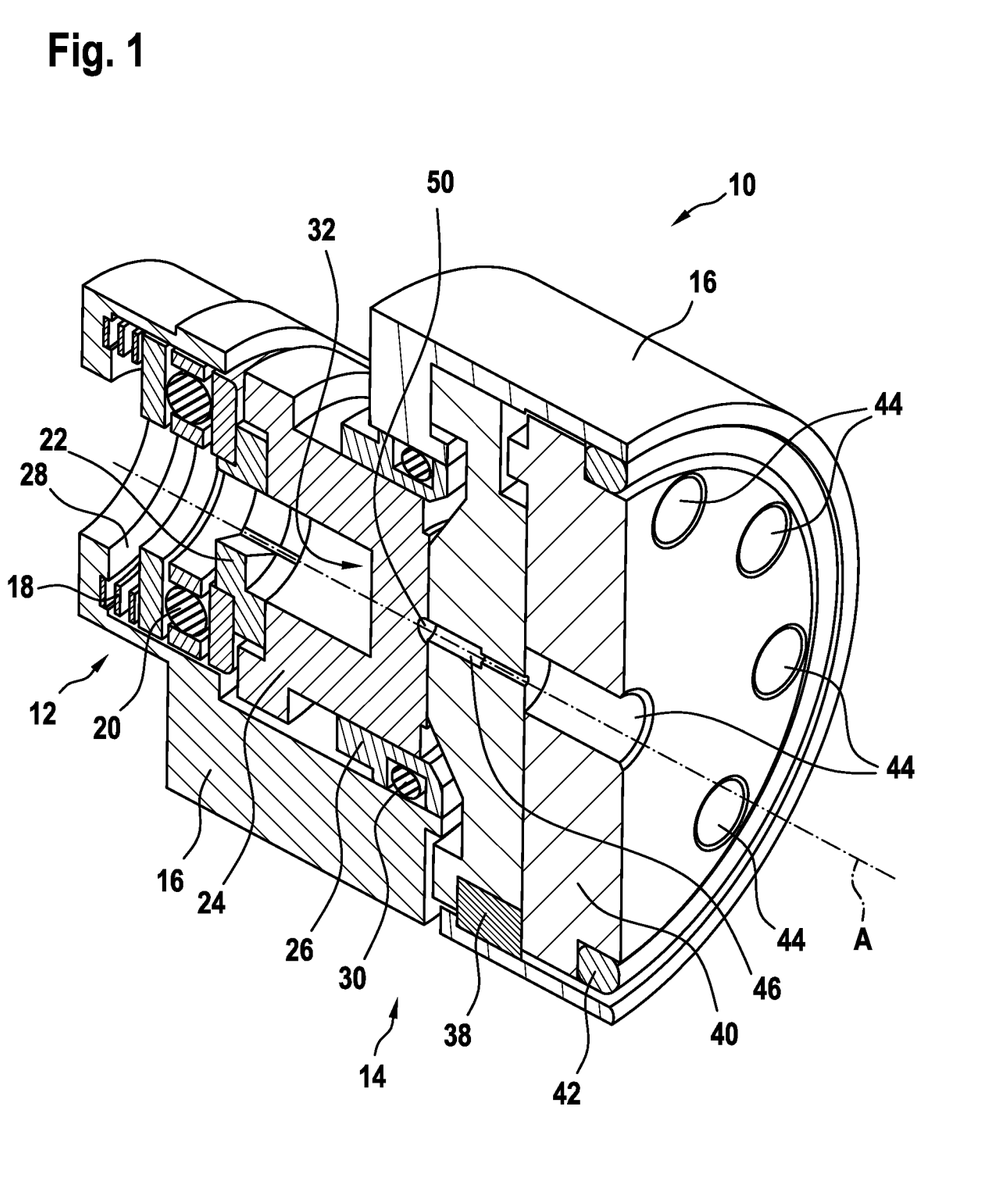
FIG. 1 shows a perspective sectional view of a rotary valve according to an embodiment of the invention.

FIG. 1 shows a rotary valve 10 with a rotor assembly 12 and a stator assembly 14 in a housing 16.

The rotor assembly 12 comprises a spring element 18, a bearing 20 (such as a ball bearing), a sleeve 22, a rotor member 24 and a sliding bearing 26. The spring element 18, which lies on an annular ground wall 28 of the housing 16, presses the rotor member 24 via the bearing 20 and the sleeve 22 against the stator assembly 14. A sealing ring 30 tights the rotor assembly against the housing 16.

The rotor member 24 is rotatably mounted to the bearing 20 and rotatable mounted inside the sliding bearing 26. The rotor member 24 is adapted to rotate about a rotation axis A. Through the annular ground wall 28, a shaft of a gear and/or an electrical motor may be mounted into the sleeve 22 and into an opening 32 of the rotor member 24.

The stator assembly 14 comprises a stator member 36, which is fixed to the housing 16. A bolt 38 prevents a rotation of the stator member 36. A port member 40 of the stator assembly 14 is arranged on the stator member 36 and fixed into the housing with a screw ring 42. The port member 40 comprises connection ports 44 for connecting lines or hoses to the rotary valve 10. The connection ports 44 are substantially cylindrical openings extending parallel to the rotation axis.

The stator member 36 comprises stator channels 46, 48 (see also FIG. 2), which enter into the connection ports 44. The rotor member 24 comprises a rotor channel 50, which in specific rotor positions interconnects the parallel stator channel 46 and one of the eccentric stator channels 48. In such a rotor position, a fluid can flow from the central port 44 to one of the other ports 44 or vice versa. In other positions, the fluid flow may be blocked.

Figure 2:
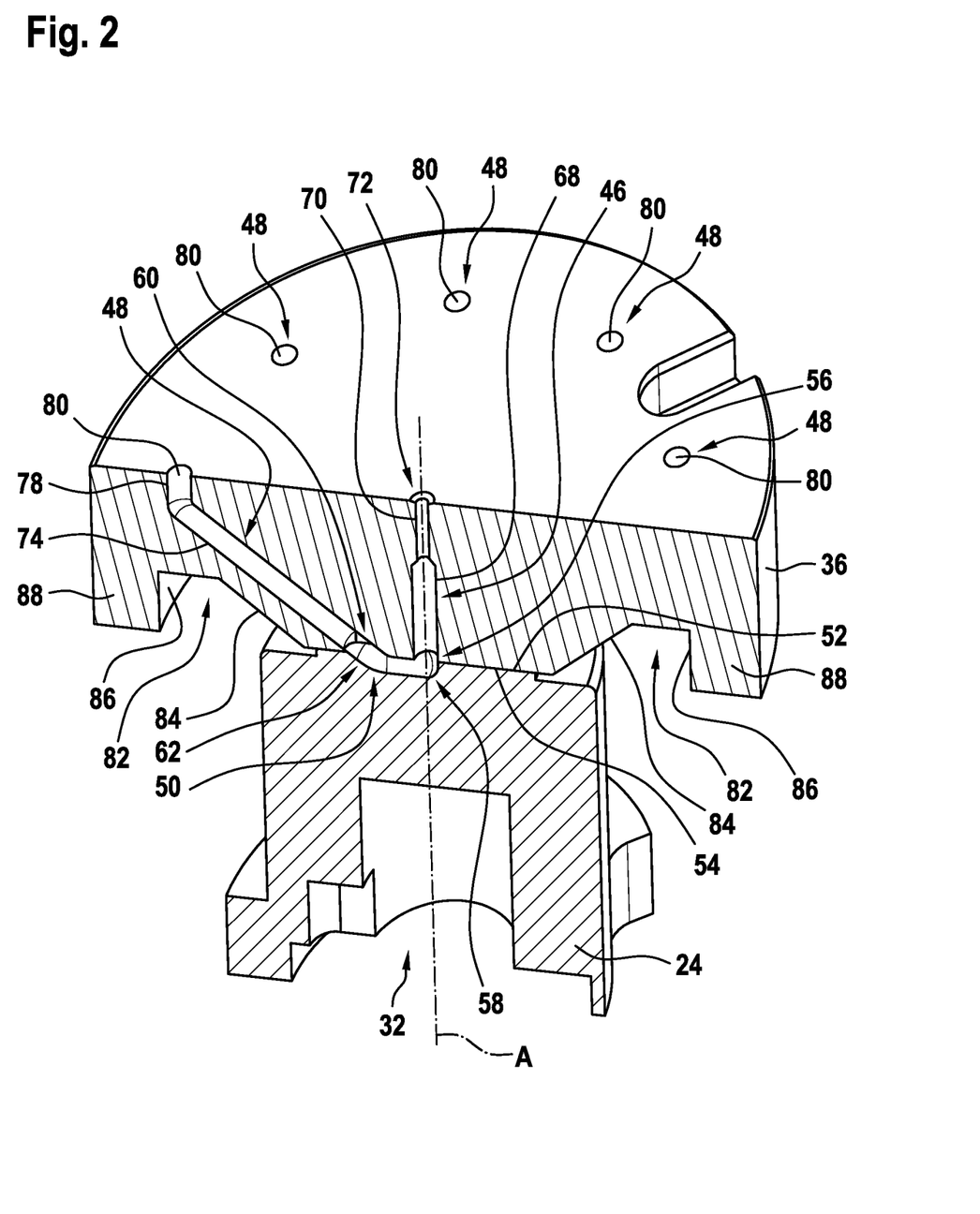
FIG. 2 shows a perspective sectional view of a part of the rotary valve of FIG. 1.
Figure 3:
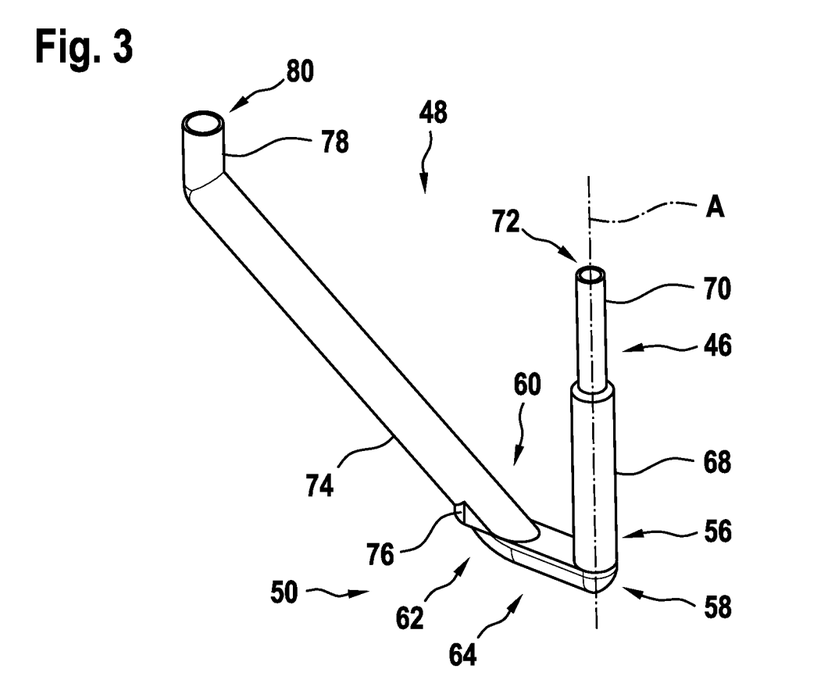
FIG. 3 schematically shows a perspective view of a stator channel of the rotary valve of FIG. 1.
Figure 4:
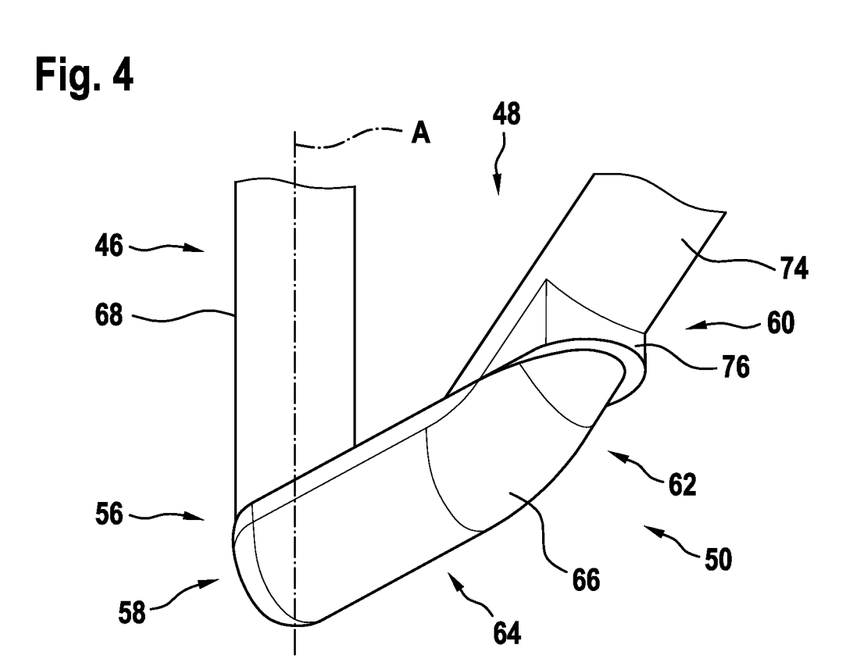
FIG. 4 schematically shows a perspective view of a part of the stator channel of FIG. 3 from a different direction.

FIG. 2 shows the rotor member 24 and the stator member 36 in more detail. FIGS. 3 and 4 show the inner surfaces of a stator channel 48 and the rotor channel 50.

The rotor member 24 has a planar, disk shaped rotor face 52 in which the rotor channel 50 is provided as a groove. The stator member 36 has a planar, disk shaped stator face 54, which faces and is in contact with the rotor face 52. The spring element 18 (see FIG. 1) presses the rotor face 52 against the stator face 54, such that a fluid tight connection is generated.

In FIG. 2, the rotor member 24 and the stator member 36 are shown in a conducting position, in which a fluid flow through the rotary valve is possible. The parallel stator channel 46 has a circular opening 56 in the stator face 54 and is positioned over a central extension end 58 of the rotor channel 50. An eccentric stator channel 48 has an irregular, elongated opening 60 in the stator face 54 and is positioned over an eccentric extension end 62 of the rotor channel.

The rotor channel 50 extends from the extension end 58 to the extension end 62 in a radial direction with respect to the rotation axis A. The extension end 58 has a semi-circular border. The extension end 62 has an ellipsoidal border. In between the extension ends, the borders of the rotor channel 50 are parallel.

Along its extension direction, the rotor channel 50 has a U-shaped cross-section with respect to planes orthogonal to the radial direction and the rotation axis A. Along a plane comprising the rotation axis A and the radial direction along which the rotor channel 50 extends, the rotor channel 50 has a longitudinal section, which, starting from the extension end 62, is inclined with respect to the rotation axis A, after that runs in radial direction and at the extension end 58 has a 90° turn into a line parallel to the rotation axis A.

At the eccentric extension end 62, the complete bottom 64 of the rotor channel 50 is inclined with respect to the rotation axis A and/or with the bottom 64 of the rotor channel 50 between the extension ends 62, 58. In particular, a substantially straight bottom line 66 is inclined in this way.

In between the extension ends 58, 62, the bottom 64 and/or the bottom line 66 runs orthogonal to the rotation axis A. At the central extension end 58, the bottom and/or the bottom line goes over into a line parallel to the rotation axis A. Partially, the bottom 64 of the rotor channel 50 at the interconnection end 58 is aligned orthogonally to the rotation axis A.

The parallel stator channel 46 has a first section 68, which opens into the rotor channel 50 at the opening 56, and a second section 70, which opens towards a connection port 44 of the rotary valve 10 at a further circular opening 72. Both sections 68, 70 have a circular cross-section. The second section 70 has a smaller diameter as the first section 68. The opening 72 extends from the diameter of the second section to the diameter of the first section 68.

Each of the eccentric stator channels 48 has a transverse channel section 74, which opens into the stator face 54 at the respective opening 60. The transverse channel section 74 runs transversely with respect to the rotation axis A. The transverse channel section 74 has a substantially cylindrical shape with a center line 74 that intersects with the rotation axis A. The bottom 64 and/or bottom line 66 of the rotor channel 50 at the interconnection end 62 is inclined with respect to the rotation axis A with the same angle as transverse channel section 74 and/or its center line.

The rotor channel 50 and its bottom 64 at the intersection end 62 are formed, such that the rotor channel 50 elongates an inner surface of the transverse channel section 74.

The opening 60 of the transverse channel section 74 has a side wall 76 running parallel to the rotation axis A at a side, where an angle between the transverse channel section 74 and the stator face 54 is acute. The opening 60 may be egg-shaped, i.e. may have a border, which is partially ellipsoidal shaped and partially circular shaped.

Each of the eccentric stator channels 48 have a parallel channel section 78, which opens towards one of the connection ports 44 with an opening 80. The channel section 78 as well as the opening 80 have a circular cross-section and the same diameter as the transverse channel section 74. An angle between the transverse channel section 74 and the parallel channel section 78 is obtuse. The parallel channel section 78 runs parallel to the rotation axis A.

The stator member 36 comprises a circular groove 82 surrounding the stator face 54. The circular groove 82 has an inclined surface 84, which is inclined with respect to the rotation axis A with the same angle as the transverse channel sections 74 of the eccentric stator channels 48. The bearing 26 surrounding the rotor member 24 protrudes into the circular groove 82. Opposite to the inclined surface 84, the circular groove 82 has a cylindrical surface 86. In such a way, a rim 88 is generated, which mechanically stabilizes the stator member 36.

Figure 5:
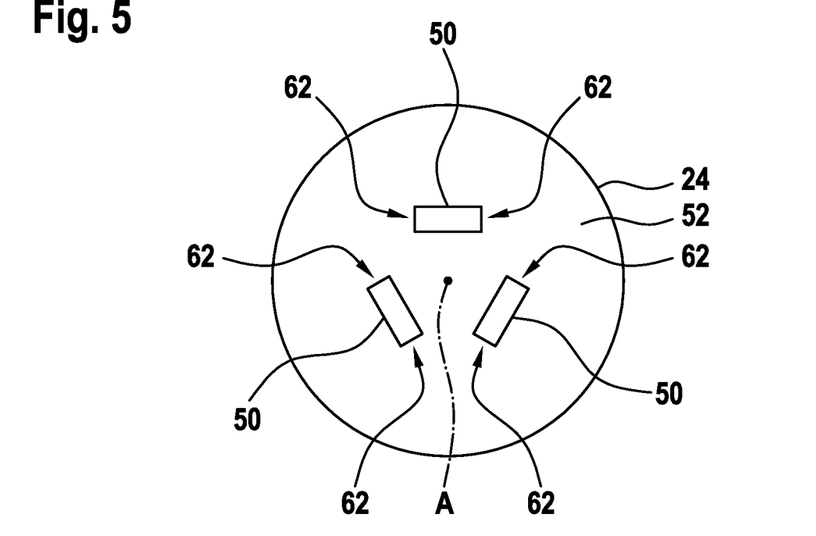
FIG. 5 shows a view onto a rotor member of a rotary valve according to an embodiment of the invention.

FIG. 5 shows that the rotor member 24 may comprise more than one rotor channel 50. In FIG. 5 a plurality of rotor channels 50 are arranged rotational symmetric to the rotation axis A. Each of these rotor channels 50 may interconnect two stator channels 46, 48 as shown in the following drawings.

Figure 6:
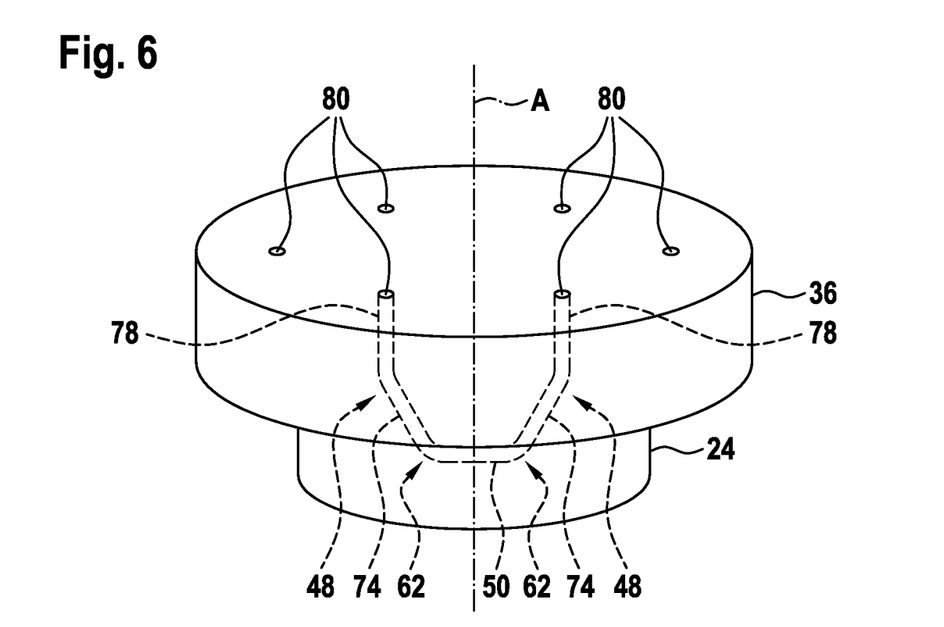
FIG. 6 shows a perspective view of a part of a rotary valve according to an embodiment of the invention.

In FIG. 6, the stator member 36 comprises two eccentric stator channels 48, which are interconnectable by a rotor channel 50 as shown in FIG. 5. The eccentric stator channels 48 may be formed as shown in FIG. 2-4. The rotor channel 50 may have intersection ends 62, such as shown in FIG. 2-4.

Figure 7:
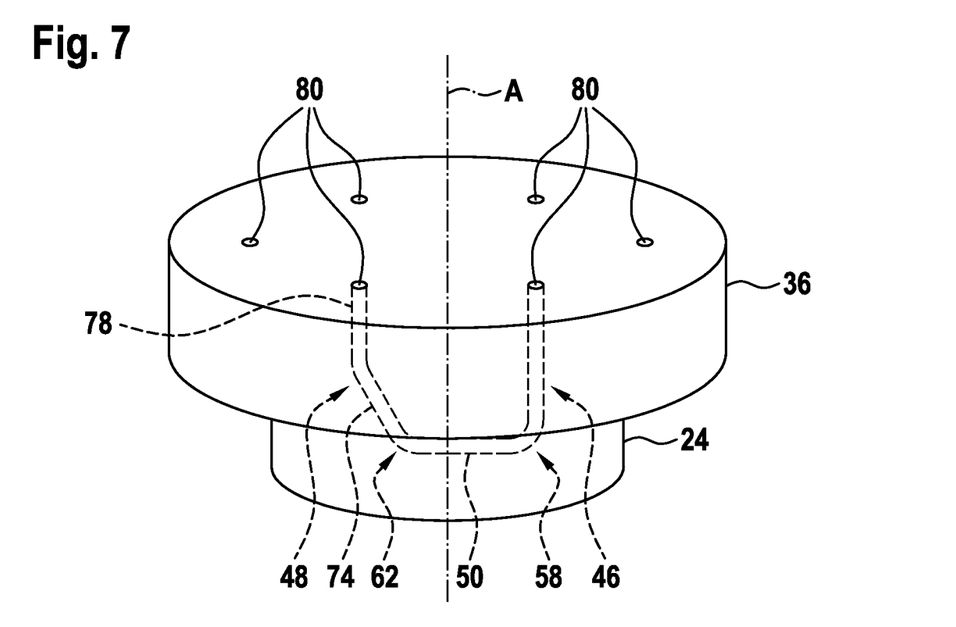
FIG. 7 shows a perspective view of a part of a rotary valve according to an embodiment of the invention.

In FIG. 7, the stator member 36 comprises an eccentric stator channels 48 and a parallel stator channel 46, which are interconnectable by a rotor channel 50 as shown in FIG. 5. The eccentric stator channel 48 may be formed as shown in FIG. 2-4. The eccentric stator channel 48 also may be formed, such as shown in FIG. 2-4, however, may be spaced apart from the rotation axis A. The rotor channel 50 may have one eccentric intersection end 62, such as shown in FIG. 2-4. The other end of the rotor channel 50 may be formed like the central intersection end 58 as shown in FIG. 2-4, however may be spaced apart from the rotation axis A.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A rotary valve, comprising:
   a stator member with a planar stator face, the stator member having a plurality of stator channels for conducting a fluid; and
   a rotor member with a planar rotor face facing and in contact with the stator face, the rotor member having a rotor channel,
   wherein the rotor member is rotatable with respect to the stator member about a rotation axis, such that in a conducting position, the rotor channel interconnects two of the stator channels and the two stator channels are in fluid communication,
   wherein at least one of the stator channels has a transverse channel section opening into the stator face and running transversely with respect to the stator face,
   wherein the rotor channel has a bottom, which at an intersection end of the rotor channel is inclined with respect to the rotor face, such that the rotor channel elongates an inner surface of the stator channel, when the rotor member is in the conducting position,
   wherein the rotor channel is a groove in the rotor face and the rotor channel is opened towards the rotor face over its complete extension,
   wherein the bottom of the rotor channel at the interconnection end is inclined with respect to the rotor face with the same angle as the stator channel, such that a cylindrical shape of the transverse channel section of the stator channel is elongated flush with the rotor channel.

2. The rotary valve of claim 1,
   wherein the rotor channel has a U-shaped cross-section.

3. The rotary valve of claim 1,
   wherein a bottom line of the rotor channel at the intersection end is inclined with respect to the rotor face.

4. The rotary valve of claim 1,
   wherein the bottom of the rotor channel at a second interconnection end, which opens into a further stator channel, is aligned orthogonally to the rotation axis.

5. The rotary valve of claim 1,
   wherein the rotor channel extends radially with respect to the rotation axis; or
   wherein the rotor channel extends tangent with respect to a circle around the rotation axis.

6. The rotary valve of claim 1,
   wherein a center line of the transverse channel section intersects with the rotation axis.

7. The rotary valve of claim 1,
   wherein the transverse channel section has an opening in the stator face, which at a side, where an angle between the transverse channel section and the stator face is acute, has a side wall running parallel to the rotation axis.

8. The rotary valve of claim 1,
   wherein the stator member comprises a parallel stator channel, which runs parallel to the rotation axis of the rotor member.

9. The rotary valve of claim 8,
   wherein the parallel stator channel has a first section, which opens into the rotor channel, and a second section, which opens towards a connection port of the rotary valve;
   wherein the second section has a smaller diameter as the first section.

10. The rotary valve of claim 8,
    wherein the stator member comprises a circular groove surrounding the stator face;

wherein the circular groove has an inclined surface, which is inclined with respect to the rotation axis.

11. The rotary valve of claim 10,
wherein the inclined surface is inclined with respect to the rotation axis with the same angle as the transverse channel section.

12. The rotary valve of clam 12,
wherein a bearing surrounding the rotor member protrudes into the circular groove.

13. The rotary valve of claim 10
wherein the stator channel with the transverse channel section has a parallel channel section, which opens towards a connection port of the rotary valve;
wherein the parallel channel section runs parallel to the rotation axis.

* * * * *

UNITED STATES PATENT AND TRADEMARK OFFICE
CERTIFICATE OF CORRECTION

| | | |
|---|---|---|
| PATENT NO. | : 12,038,091 B2 | |
| APPLICATION NO. | : 17/756099 | |
| DATED | : July 16, 2024 | |
| INVENTOR(S) | : Anthony Donetz et al. | |

It is certified that error appears in the above-identified patent and that said Letters Patent is hereby corrected as shown below:

In the Claims

Column 9, Line 7: Claim 12, "of claim 12: should be -- of claim 10 --.

Signed and Sealed this
Third Day of September, 2024

Katherine Kelly Vidal
*Director of the United States Patent and Trademark Office*